Figure 1:
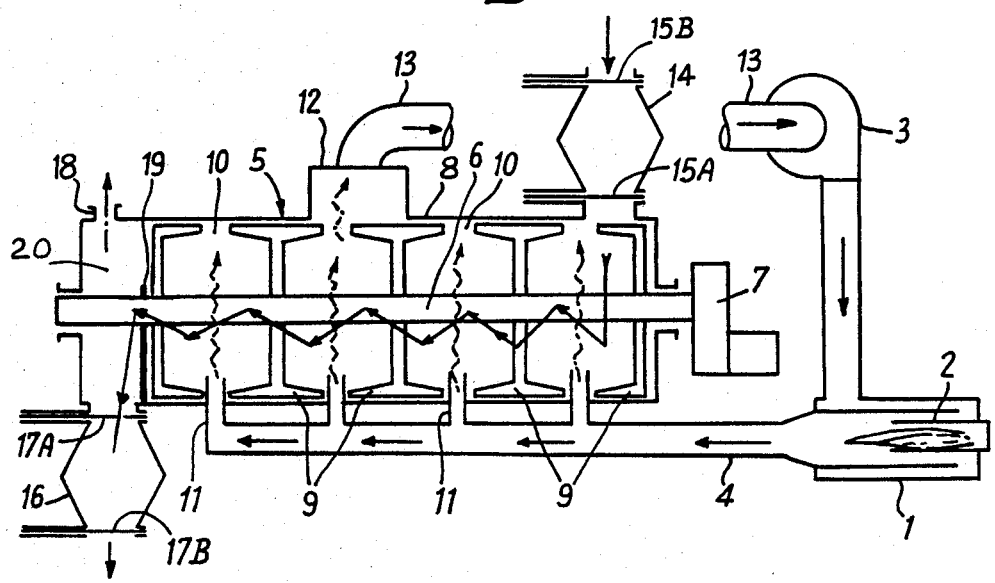

United States Patent [19]

Bourgeois

[11] Patent Number: 4,816,572

[45] Date of Patent: Mar. 28, 1989

[54] THERMOCONDENSED LIGNOCELLULOSE MATERIAL, AND A METHOD AND AN OVEN FOR OBTAINING IT

[75] Inventor: Jean-Paul Bourgeois, Creteil, France

[73] Assignee: Association pour la Recherche et le Developpement des Methodes et Processus Industriels (Armines), Paris, France

[21] Appl. No.: 941,178

[22] Filed: Dec. 12, 1986

[30] Foreign Application Priority Data

Dec. 18, 1985 [FR] France .............................. 85 18765

[51] Int. Cl.$^4$ .............................................. C08G 18/08
[52] U.S. Cl. .......................................... 536/56; 162/9; 162/23; 162/47; 562/515
[58] Field of Search ................. 536/56; 162/9, 23, 47; 562/515

[56] References Cited

U.S. PATENT DOCUMENTS

| | | | |
|---|---|---|---|
| 1,941,817 | 1/1934 | Sweeney et al. | 536/56 |
| 3,241,991 | 3/1966 | Glab | 536/56 |
| 4,553,978 | 11/1985 | Yvan | 562/515 |

*Primary Examiner*—Joseph L. Schofer
*Assistant Examiner*—Peter D. Mulcahy
*Attorney, Agent, or Firm*—Griffin, Branigan & Butler

[57] ABSTRACT

This material which has a hemi-cellulose content of less tha 2%, a benzopyrene content of less than 2 ug/kg and a calorific value which is about 20% greater than that of the starting material is obtained by isothermal treatment between 220° C. and 280° C. for a period of thirty minutes using crossed flows of treated material and of oxygen-free hot gases in an oven including stirring means (6,9) and a gas generator (1) with the gas being circulated by a fan (3).

5 Claims, 1 Drawing Sheet

THERMOCONDENSED LIGNOCELLULOSE MATERIAL, AND A METHOD AND AN OVEN FOR OBTAINING IT

The invention relates to a new "thermocondensed" lignocellulose material, to a method of obtaining said thermocondensed lignocellulose material by isothermal heat treatment of lignocellulose material, and an oven for implementing the method. The term "thermocondensed" is used herein to designate a lignocellulose material which has been subjected to chemical reactions together with elimination of its constituent water, and optionally together with internal decarboxylation reactions.

This is true, in particular, of reactions using pentosan type heterocycles

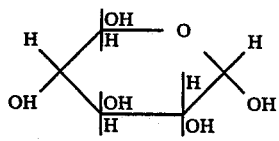

which can eliminate $H_2O$ molecules by bridging.

Prior heat treatments of wood and lignocellulose materials, and in particular of wood, mainly comprise operations of carbonization and of torrefaction, with highly specific well-adapted corresponding installations therefor, with these operations being distinguished by the temperature level to which the lignocellulose material is subjected. In outline, torrefaction consists in briefly exposing the lignocellulose material to a temperature of less than 300° C. while in contact with the air and under the influence of direct heat in order to cause incomplete carbonization. The products obtained are given various names such as torrefied wood or torrefied charcoal without there being any apparent correlation between the nature of the heat treatment applied and the constitution of the resulting torrefied product. Carbonization takes place at higher temperatures, preferably in the vicinity of 450° C., in order to provide maximum elimination of the tars which are generated by in-depth destruction of the lignocellulose material and which are unsuitable for certain applications of the resulting product.

In the state of the art, as illustrated in particular by French patent specifications Nos. 839 732 and 872 164, or German patent specification No. 2 802 213, it is considered sufficient to specify the temperature level of the heat treatment in order to characterize the resulting product which is referred to as torrefied wood or wood charcoal depending on whether the critical temperature range of 270° C. to 300° C. has been exceeded or not. This temperature range is related to the appearance of an exothermic effect in the thermochemical decomposition reactions of the lignocellulose material.

In addition, the resulting products, namely torrefied wood or wood charcoal are not very homogeneous. For torrefied wood, the heat treatments applied heretofore are unsuitable for obtaining homogeneous products, and the products are characterized above all by their color or their surface appearance. The means implemented for obtaining these products are convective means using combustion gases or hot air at temperatures of about 280° C. to 300° C. as the energy source. In addition, the temperature range is defined very widely and documents are often contradictory. In practice, the resulting product is highly dependent on its initial humidity and on its granulometry. The product may even be carbonized more or less deeply even when the indicated conditions are satisfied, if it is not initially sufficiently damp to be able to moderate the heat flow to which it is subjected. In any event, the resulting product is highly heterogeneous and cannot satisfy well-defined chemical and physico-chemical characteristics.

European patent specification No. 0 073 714, which corresponds to U.S. Pat. No. 4,553,978, provides further details enabling better uniformity to be obtained in the final product which is simultaneously characterized by its calorific value, its hygroscopicity, and its fixed carbon content. However, in order to obtain this product, it is essential to operate in an inert gaseous or humid medium, without exceeding 280° C. and for a period of time which depends on the size of the pieces treated, which period may vary from thirty minutes to five hours. The purpose of these conditions is to avoid setting off local pyrolysis reactions which rapidly become uncontrolable, with this method being based on the idea that pyrolysis reactions are not set off below 280° C.

However, the resulting torrefied product contains a high level of fixed carbon (35%) which is indicative of a high degree of carbonization by resinification of the lignocellulose structure.

In addition, the conditions under which the heat treatment is performed are not favorable for application to a continuous process of industrial production.

It has now been observed by means of tests using enthalpimetric microanalysis and microgravimetric analysis that:
  all thermal transformation reactions of lignocellulose material are indeed exothermic even below 280° C.; and
  below this temperature thermal degradation reactions of lignocellulose material may be classed in two categories having different rates of reaction:
    the first category which corresponds, in fact, to thermocondensation reactions, has a high reaction rate but this rate falls off rapidly with time and substantially cancels out at an equilibrium level for the transformation rate in relation to the temperature and to the hemicellulose (pentosan) content of the treated product; and
    the second category which is related to a carbonization reaction with in-depth destruction of the lignocellulose structure, is a relatively slow reaction in the temperature range under consideration. It increases sharply above 280° C. to provide complete pyrolysis of the product.

It is thus useful, for industrial purposes, to define technical conditions which enable thermocondensation reactions of the lignocellulose material to be obtained on a macroscopic scale in a manner which is continuous, specific, and selective, while avoiding the occurrence of unwanted carbonization reactions.

Consequently, the main aim of the invention is to provide an industrial method and a commercially usable installation which operates continuously while allowing exothermic reactions during heat treatment of lignocellulose material to be monitored and/or inhibited at any moment in order to selectively obtain thermocondensation of the treated product.

According to the invention, the method starts from highly divided lignocellulose material such as sawdust or particles of any shape, and previously put into the anhydrous state, this material is displaced as a flow between two separated points by being subjected to stirring inside a volume of substantially oxygen-free hot gases; the temperature of these gases is maintained at the desired temperature and the hot gases are caused to flow in a direction including a plurality of spaced apart paths extending transversely to the direction of displacement of the treated material, thereby setting up flows of hot gases which cross the flow of treated material. The operation may take place at atmospheric pressure. A different pressure value may be used, but does not give rise to any special advantage.

Preferably, for a lignocellulose material of resinous nature (i.e. derived from softwood (conifer) species) the temperature lies in the range 240° C. to 280° C., and for a material of some other nature, for example various hardwood species, the temperature lies in the range 220° C. to 265° C. If the treated material is not in the anhydrous state, the method includes a prior operation of desicating said material.

Preferably, when using a starting material having residual humidity, the method in accordance with the invention then includes an operation of preheating a material initially at ambient temperature up to 200° C., prior to raising the treatment temperature to the range 250° C. to 280° C., said heating operation lasting long enough to completely eliminate humidity and obtain material which is substantially anhydrous. Preferably the residual humidity is not more than about 5% and the duration of the preheating operation is not more than five minutes.

The heat treatment in accordance with the invention corresponds to a thermocondensation optimum for a minimum of carbonization type reactions. More precisely, thermocondensation may be selectively obtained solely for durations of less than thirty minutes; beyond that length of time, the quality of the thermocondensed product is degraded by slow carbonization which modifies the physical and chemical properties of the final product.

Thermocondensation reactions begin at about 200° C.; the starting threshold for these reactions is related to the hemicellulose content of the treated lignocellulose product. Taking account of the poor heat transfer coefficient of lignocellulose materials, of the exothermic character of the above-mentioned transformations, and of the hygroscopicity of the material, it is clear that the temperatures reached locally on a microscopic scale by the treated material depend closely on the operative process adopted for transferring heat, and that the chemical and physico-chemical characteristics of the resulting product are directly correlated with the efficiency of the heat transfers and the mass transfers to which the starting material is subjected.

In a practical implementation of the method, the treated material passes through a first zone in which its temperature is rapidly raised to 200° C. on contact with the volume of hot gases, a second zone in which its temperature is progressively raised up to the temperature of the volume of hot gases in order to set off thermocondensation, and a third zone in which its temperature is substantially equal to the temperature of the volume of hot gases in order to enable thermocondensation to take place under isothermal conditions.

In the second zone, the temperature is raised from 200° C. to the selected value, between 220° C. and 280° C., as explained elsewhere, and this temperature is maintained in the third zone.

A quantitative study of the heat liberating or heat absorbing nature of the thermochemical transformations of wood show that the enthalpy of thermocondensation reactions of lignocellulose material is substantially independent of temperature in the torrefaction temperature range, contrary to that which is implied in the prior art.

In contrast, the kinetics of these transformations are highly correlated with temperature. This indicates that the constitution of the final product is highly dependent on the thermal profile imposed on the material throughout its entire transformation. At each moment in the heat treatment, heat is exchanged between the material and the heat source. In order to obtain isothermal treatment, such exchanges of heat must be such that they do not substantially modify the temperature of the source, and that they do not cause the temperature of the material to rise more than a few degrees above that of the source.

This result is obtained, in accordance with the invention, by setting up very active convection between the gas phase which constitutes a source of heat and the heated material. The gas phase is permanently recycled in order to enable its temperature level to be accurately regulated. The mode of flow between the gas phase and the material is preferably of the cross-current type in order to bring the assembly as close as possible to thin layer treatment conditions which favor uniformity of treatment.

Figure 2:
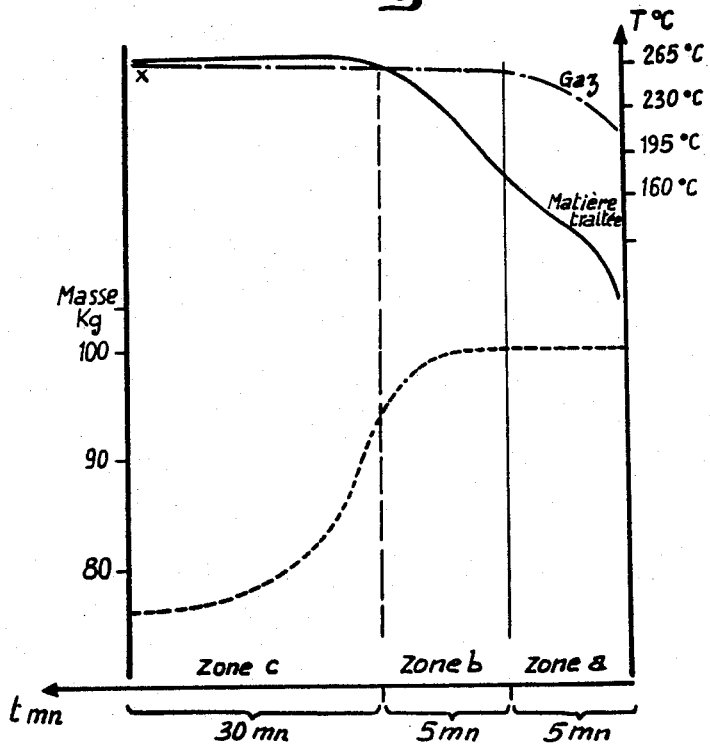

Reference is now made to the accompanying drawing in order to describe, by way of example, an oven for implementing the method of the invention. In this drawing:

FIG. 1 is a diagrammatic general view of a cross-current heat treatment oven; and FIG. 2 is a graph showing temperature in ° C. on a right-hand vertical axis plotted as a function of time in minutes along the horizontal axis together with a left-hand vertical axis showing the mass of material treated.

FIG. 1 shows a hot gas generator 1 preferably containing a gas burner 2 fed with gas which is diluted by a fan 3 and having an outlet duct 4 for combustion gases. An elongate oven 5 which is horizontally disposed, although a slight inclination relative to the horizontal would be possible if so desired, is equipped with a central shaft 6 which is rotatably coupled at one end to a motor and stepdown gear assembly 7. The oven 5 is delimited by a side wall 8 and the central shaft 6 is provided with radial stirring and displacement means 9. These means 9 extend radially to the proximity of the side wall 8 and they are spaced apart from one another in the longitudinal direction of the central shaft 6 and of the oven 5 by gaps 10. At the bottom of the oven 5, in the gaps 10, there are openings having ducts 11 penetrating therethrough and coming from the duct 4 to convey the combustion gases from said duct 4 into the oven 5. Over the top middle portion of the oven 5 there is a gas collector 12 connected to an exhaust duct 13 which leads to the inlet to the fan 3. Overall, the gases follow a substantially radial path inside the oven 5 and mainly in the bottom portion thereof, as indicated by broken lines. If the oven were longer, it would be advantageous to provide a plurality of gas collectors 12 spaced therealong in order to encourage radial flow of the combustion gases coming from the burner 2.

The top of one end of the oven 5 is connected to a loading hopper 14 having top and bottom openings which are equipped with closure members 15B and 15A. The bottom of the opposite end of the oven 5 is connected to an unloading hopper 16 having top and bottm openings which are likewise fitted with closure members 17A and 17B. The treated material drops into the oven 5 from the loading hopper 14 and it is simultaneously displaced and stirred by the radial stirrers 9 along the longitudinal direction of the oven 5 up to the unloading hopper 16 along a path which is indicated by an unbroken line with arrows thereon suggesting that the material rises and falls as it moves along under the combined effect of the radial stirrers 9 and the flows of combustion gases coming from the ducts 11.

In operation, once a continuous regime has been established, the water vapor which is produced by the thermocondensation reactions of the lignocellulose material is continuously recycled by the fan 3. The combustion gases provided by the burner 2 are used mainly for raising the temperature on starting, and thereafter solely for maintaining the temperature. At the top of the oven 5 and at the same end as the unloading hopper 16, there is an exhaust opening 18 via which excess gases may escape by passing through a final enclosure 20.

It can clearly be seen from the above that the hot gases and the treated material flow across each other. Just before the closure member 17A of the unloading hopper 16 there is a transverse plate 19 which extends over the bottom portion of the oven 5 beyond the last radial stirrer 9. This transverse plate 19 of limited height determines the thickness of the layer of treated material which permanently exists inside the oven while progressing from the inlet towards the outlet. This flow of material between two separated points of the oven has flows of hot gases crossing therethrough which are then recycled along spaced apart parallel paths which cross the flow of treated material.

The burner 2 provides a regulated volume (by means not shown) of hot gas (which is practically free from oxygen) at a temperature such that its dilution in the recycling circuit maintains the gases at their inlets to the oven 5 at a substantially constant temperature corresponding to the desired thermocondensation temperature, i.e. to a temperature in the range 220° C. to 280° C. This temperature range depends on the species of wood being treated. For example a hardwood such as beech or chestnut,..., is preferably treated at a temperature which is 15° C. to 20° C. lower than that at which a conifer wood such as pine or fir is treated. The treatment temperature is related to the hemi-cellulose content of the heated material. The length of the time the product remains in the oven is determined by the transverse plate 19 which serves to fix the volume occupied by the material in the oven. A synchronized feeder and extractor device regulates the flow rate of the raw material and of the finished product by controlling the closure members 15A, 15B, and 17A, 17B. The assembly is maintained at atmospheric pressure.

The design and the operation of the oven are such that a high apparent porosity is obtained in the bed of shavings, thereby facilitating gas flow. The gas recycling rate is high and corresponds to the gases remaining inside the reactor for a very short time, lying in the range one second to ten seconds. The time that the material remains under isothermal treatment is preferably about thirty minutes for a divided material such as small shavings or sawdust.

These operating conditions provided by an oven in accordance with the invention ensure that the heat source is quasi-isothermal. The treated material which is preferably dried before being introduced into the reactor meets the gas flow in a cross-flow process. The speed at which its temperature rises is proportional to the temperature difference between the temperature of the recycled gas (maintained by the burner 2) and its own inlet temperature. The temperature profile illustrated by the FIG. 2 graph can thus be completely controlled when acting on the temperature of the recycled gas and on the flow rate and the retention time of the treated material.

The FIG. 2 graph shows three distinct zones, running from the upstream end towards the downstream end of the oven 5. In a first zone a at the inlet thereto, the gases (whose temperature is shown by a dot-dashed curve) rise rapidly in temperature after their cooling during their out-of-oven recycling, in order to return to a temperature of about 245° C., which temperature remains constant in the following zones b and c, up to the outlet. The treated material is colder at the inlet; and it has to pass through zones a and b in order to reach the gas temperature of 245° C. The isothermal treatment, per se, takes place in the zone c in which the material is retained for thirty minutes. The temperature of the material is shown by the solid curve. In spite of the exothermic reactions which take place, as mentioned above, the operating conditions of the method of the invention are such that the temperature of the treated material rises very little above the temperature of the gases, so that the temperature of 265° C. is never exceeded. The dashed line curve shows that for a mass of 100 kg of anhydrous material, 76 kg of thermocondensed material are obtained. The gases may be water vapor, $CO_2$, the vapors due to thermocondensation, or a mixture of two or three of said gases.

There now follow two examples of implementations of the method of the invention using the FIG. 1 oven. Further operating details of the method are explained in the examples.

EXAMPLE 1

100 kg/h of shredded wood (hardwood platelets—beech—of the paper-making platelet type, and expressed in terms of anhydrous wood) is continuously inserted into an oven such as that shown in FIG. 1. The feed takes place continuously by inserting successive loads at regular time intervals. The wood has been previously dried so that its residual humidity is less than 5%.

The load level in the oven 5 is kept constant by means of the plate 19 which can be used to ensure that the bed of shavings in the oven is maintained at a constant thickness. The wood inserted by the closure member 15A moves an equivalent quantity of product stage-by-stage to be removed from the oven by overflowing the plate 19, and is then finally removed from the oven via the exit closure member 17A. The closure members provide good sealing so as to minimize air inlet. The bed of shavings is stirred by rotating the shaft 6 which is provided with blades 9 which are slightly inclined so as to move the material forwardly through the oven. The motor and step-down gear unit 7 allows the desired speed of rotation to be used. The gases formed during thermocondensation are sucked into the collector 12 and are recycled by means of the fan 3. The burner 2 is adjusted to operate without excess air and the temperature of the gas mixture at the outlet from the generator is regulated to the desired value. The useful volume of the reactor is about 0.25 m$^3$ and the fan 3 recycles 375 m³/h of gas. The average retention time of the gases in contact with the product inside the oven is about two seconds, and the mass flow rate of gas passing through the oven is three to four times higher than the mass flow rate of lignocellulose material through the reactor. This ratio may vary in the range 1 to 10, for example, without going beyond the scope of the invention.

The material is retained for three to four minutes in the zone a of the oven which corresponds to a rapid rise in the temperature of the material up to about 180° C. –200° C., i.e. up to a temperature which is lower than that required for thermocondensation reactions. This zone corresponds to the portion of the method which consumes the most energy. The retention time in the zone a is related to the residual humidity; the residual humidity must be eliminated before arriving in zone b.

Thermocondensation reactions begin in zone b. At the same time, the rate at which energy is transmitted from the gas to the product reduces as the temperature of the product rises, thereby producing an accelerating effect on reaction kinetics at low temperature and a moderating effect on approaching the desired equilibrium temperature. It is thus possible throughout the thermocondensation method to modulate the speed of said transformation so as to substantially distribute the heat produced by said reaction.

In zone c, the gases and the treated material are at substantially the same temperature. Exothermic thermocondensation reactions take place in the material, but these reactions take place at a slow and controlled speed. The corresponding heat flow is easily absorbed by the gases, thereby avoiding any local overheating.

The average retention time in the zone c is thirty minutes.

When operating under the conditions indicated in this example, at a treatment temperature in zone c of 265° C., 76 kg of thermocondensed product have been obtained, giving the following results on analysis:

| C % = 56.8 | Residual pentosans | 1.8% |
|---|---|---|
| H % = 5.2 | Fixed carbon | 27.1% |
| O % = 36.2 | Net calorific value | 5,200 kcal/kg (21,736 kJ) |

EXAMPLE 2

Example 2 is a variant of example 1 using a different treatment temperature in the zone c and using the same starting material. The following amounts of thermocondensed product were obtained for the following isothermal treatment temperatures: 230° C., 91 kg of product; 250° C., 84 kg of product; and 280° C., 71 kg of product. A high degree of selectivity for decomposition of hemicelluloses over attack by other components was obtained only between 250° C. and 265° C.

For these two values of thermocondensation temperature, the following benzopyrene contents were observed in the thermocondensed material: 0.45 µg/kg for treatment at 250° C. and 1.1 µg/kg for treatment at 265° C.

At the same two thermocondensation temperatures, the observed net calorific value of the material was 5,100 kcal/kg (21,318 kJ) for treatment at 250° C. and 5,215 kcal/kg (21,800 kJ) for treatment at 265° C.

Thus, it is clearly apparent that the properties of the thermocondensed material in accordance with the invention are closely related to the treatment temperature in zone c.

These properties depend in particular on the behavior of three essential compounds during heat treatment, namely: hemicellulose, cellulose, and lignin. The method of the invention makes it possible to control the transformation selectively in favor of one or other of these substances.

Thermocondensed material resulting from thermocondensation of lignocellulose material is characterized by:

a mass content of residual hemi-cellulose which is less than 2%, thereby conferring a highly hydrophobic character to the material;

substantially total absence of internal tars, this characteristic is verified by the low benzopyrene content (less than 2 µg/kg); and a net calorific value corresponding to an increase of about 20% over the calorific value of the material prior to treatment (when considered in the anhydrous state).

Thermocondensation of lignocellulose material in accordance with the invention is remarkable in that:

an energy efficiency of transformation (i.e. the energy recovered in the thermocondensed material divided by the energy in the initial material) which is greater than 90%; and a manufacturing mass yield (mass of thermocondensed material divided by the initial mass of anhydrous material) which is related to the thermocondensation temperature and to the species treated.

This mass yield is generally as follows:

| | | |
|---|---|---|
| Hardwoods | thermocondensed at 265° C. | 75% to 80% |
| | thermocondensed at 250° C. | 80% to 85% |
| Softwoods | thermocondensed at 280° C. | 75% to 80% |
| | thermocondensed at 265° C. | 80% to 85% |

The net calorific value (PCI) of the thermocondensed material may also be related to the net calorific value of the treated lignocellulose material of the substance (PCIo) and to the mass yield (RM) and the energy yield (RE) by the equation:

$$PCI = PCIo \times (RE/RM)$$

For example:

| Hardwood thermocondensed at 265° C. | | | |
|---|---|---|---|
| PCIo | RM | RE | PCI |
| 4,300 kcal/kg (17,970 kJ) | 76% | 91.9% | 5,200 kcal/kg (21,736 kJ) |
| Conifers thermocondensed at 280° C. | | | |
| PCIo | RM | RE | PCI |
| 4,550 kcal/kg (19,000 kJ) | 77.5% | 92% | 5,400 kcal/kg (25,570 kJ) |

The material obtained by the method of the invention may be used in various applications, for example:

By using the method of the invention to treat hardwoods or softwoods at a temperature accurately defined as a function of the species and lying between about 220° C. and 250° C., it is possible to selectively obtain resinification of the hemicelluloses in the wood while leaving the cellulose and the lignin substantially intact. Isothermal treatment makes it possible to obtain a uniform product whose subsequent humidity uptake is less than 5%, having good mechanical properties while being easy to break (breakable but not friable), and having the property of being able to absorb organic compounds.

The thermocondensed material of the invention is clearly distinct from conventional wood charcoal.

Carbonization is accompanied by the formation of more or less condensed aromatic cyclics due to the destruction of the lignocellulose structure. During this transformation, a fraction of these aromatic compounds is liberated in the form of tars. Benzopyrenes are typical constituents of such tars. Benzopyrenes have been discovered to have considerable cancerogenic properties. The content of benzopyrenes in wood charcoal must thus be kept as low as possible. Heretofore, the only way of eliminating these unwanted constituents has been to purify wood charcoal by treatment at high temperature (about 500° C.). Thus, "carbo-purified" wood charcoals contain only a few μg/kg of benzopyrene whereas "forest" charcoals frequently contain more than 20 μg/kg of these compounds.

Thermocondensed material of the invention contains less than 2 μg/kg of benzopyrene. The ease at which it may be lighted, the considerably better performance of its embers in a fire compared with those of wood, the high degree of heat delivered by its embers all make it a material which is well adapted to replacing wood and wood charcoal by virtue of the absence of undesirable products, by virtue of its mechanical and heat-producing qualities, and because of its high manufacturing yield.

We now turn to cooling the thermocondensed material obtained after the heat treatment described above and illustrated by Examples 1 and 2.

Using an oven of the kind shown in FIG. 1, the thermocondensed material overflows the top of the transverse wall 19. It then falls into the last enclosure 20 together with a cooled fraction of the gases on top of the closure member 17A. In this enclosure 20 at reduced temperature and in a non-oxidizing atmosphere, the material is allowed to cool down to about 180° C. prior to being dropped into the hopper 16.

Other means, known per se, may be used to control the atmosphere in which cooling takes place. For example, spraying a small amount of water on the material sets up a steam atmosphere together with faster cooling. Whatever means is used, the important operation according to the method of the invention is to avoid putting the material into contact with an oxidizing medium until it has cooled to less than 200° C.

The product obtained by the method of the invention has many uses. For example: when the temperature is limited to 250° C. it is possible to obtain selective resinification of the wood hemi-celluloses, while the celluloses and the lignins remain substantially intact. The methOd of the invention then provides a uniform product which subsequently takes up less than 5% humidity, having good mechanical performance while being easy to crush (it breaks easy but is not friable) and having the property of absorbing organic compound. Such a product can advantageously replace raw wood in particle panels, fibers, etc.

Also, thermocondensed wood in accordance with the invention may be compacted without using a binder. After densification, a stable product is obtained having a high concentration of energy and a density greater than unity. the energy per unit volume of this product is substantially one-half of domestic heater oil, (i.e. three to four times greater than that of raw biomass), thereby facilitating storage of this renewable energy source.

In addition to their low benzopyrene content, thermocondensed wood is easy to light and its embers behave better in a fire than do those of wood: the high degree of heat delivered by the embers makes this material well adapted to heating using wood, in particular for developing countries.

I claim:

1. A heat treatment method for thermocondensing lignocellulose material in divided particulate state and in an anhydrous state, which comprises:

displacing with stirring the said material along a first path within a volume of substantially oxygen-free hot gases at a temperature in the range 220°–280° C. through a first zone where the temperature of the material is rapidly raised up to 200° C., through a second zone in which the temperature of the material is progressively raised up to the temperature of hot gases, and through a third zone where the temperature of the material is maintained near the temperature of the hot gases, said hot gases being flowed through said material passing through said three zones along a plurality of spaced apart second paths which extend transversely to the direction of displacement of said material along the first path, thereby providing flows of the hot gases which are transverse to the flow of the said material, regulating the displacement of the said material along the first path such that the duration of the heat treatment of the said material does not exceed thirty minutes, and recovering and cooling the so thermocondensed lignocellulose material.

2. A method according to claim 1, wherein the temperature of the hot gases in the second zone is sufficient to start thermocondensation of the said material, and the temperature in the third zone is sufficient to perform thermocondensation under isothermal conditions.

3. A method according to claim 2, wherein the temperature of the treated material is raised in the second zone from 200° C. to the selected treatment temperature in the range 220° C. to 280° C. and is maintained in the third zone at between 220° C. and 280° C.

4. A method according to claim 1, wherein the volume of hot gases is caused to flow at a speed which corresponds to an average duration of contact with the treated material lying in the range 1 second to 10 seconds.

5. A method according to claim 1, wherein the atmosphere is constituted by one of the following gases: water vapor; carbon dioxide; vapors created by the treated material thermocondensing; and a mixture of two or three of said gases.

* * * * *